United States Patent
Fujishiro

(10) Patent No.: US 12,477,308 B2
(45) Date of Patent: Nov. 18, 2025

(54) COMMUNICATION CONTROL METHOD AND USER EQUIPMENT

(71) Applicant: KYOCERA Corporation, Kyoto (JP)

(72) Inventor: Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 412 days.

(21) Appl. No.: 18/058,835

(22) Filed: Nov. 25, 2022

(65) Prior Publication Data

US 2023/0091236 A1   Mar. 23, 2023

Related U.S. Application Data

(63) Continuation of application No. PCT/JP2021/020111, filed on May 27, 2021.

(30) Foreign Application Priority Data

May 28, 2020   (JP) .................................. 2020-093497

(51) Int. Cl.
*H04W 36/00* (2009.01)
*H04W 4/06* (2009.01)

(52) U.S. Cl.
CPC .......... *H04W 4/06* (2013.01); *H04W 36/0007* (2018.08)

(58) Field of Classification Search
CPC .......................... H04W 36/0007; H04W 76/40
See application file for complete search history.

(56) References Cited

U.S. PATENT DOCUMENTS

| 10,530,595 | B2 | 1/2020 | Zhu et al. |
| 11,184,186 | B2 | 11/2021 | Zhu et al. |
| 2009/0080351 | A1* | 3/2009 | Ryu ............... H04L 1/0003 370/312 |
| 2013/0128797 | A1 | 5/2013 | Newberg et al. |
| 2016/0308684 | A1 | 10/2016 | Zhu et al. |
| 2019/0166580 | A1 | 5/2019 | Prasad et al. |
| 2021/0258918 | A1* | 8/2021 | Hong ............... H04W 36/0007 |
| 2023/0091236 | A1 | 3/2023 | Fujishiro |

FOREIGN PATENT DOCUMENTS

| CN | 105900355 A | 8/2016 | |
| EP | 1 507 364 A2 | 2/2005 | |
| EP | 2 365 713 A1 | 9/2011 | |
| EP | 3 089 487 A1 | 11/2016 | |
| EP | 3017616 B1 * | 12/2018 | .......... H04L 12/1868 |
| WO | 2021/241663 A1 | 12/2021 | |

OTHER PUBLICATIONS

Samsung, "PDCP operation for MBMS", 3GPP TSG-RAN WG2 #41, R2-040437, Feb. 16-20, 2004, Malaga, Spain, total 5 pages.
Huawei, "New Work Item on NR Multicast and Broadcast Services", 3GPP TSG RAN Meeting #86, RP-193248, Dec. 9-12, 2019, total 5 pages, Sitges, Spain.

\* cited by examiner

*Primary Examiner* — Pamit Kaur
(74) *Attorney, Agent, or Firm* — Studebaker Brackett PLLC

(57) ABSTRACT

A user equipment includes a receiver configured to receive a data packet belonging to an MBS service via a PTM radio bearer, and a controller. The receiver receives, from a base station, configuration information for configuring association between the PTM radio bearer and a PTP data path for receiving the data packet belonging to the MBS service. The controller associates the PTP data path with the PTM radio bearer based on the configuration information.

6 Claims, 13 Drawing Sheets

COMMUNICATION CONTROL METHOD AND USER EQUIPMENT

RELATED APPLICATIONS

The present application is a continuation based on PCT Application No. PCT/JP2021/020111, filed on May 27, 2021, which claims the benefit of Japanese Patent Application No. 2020-093497 filed on May 28, 2020. The content of which is incorporated by reference herein in their entirety.

TECHNICAL FIELD

The present invention relates to a communication control method and a user equipment in mobile communication systems.

BACKGROUND OF INVENTION

The 3GPP (3rd Generation Partnership Project), which is a standardization project for mobile communication systems, has been conducting standardization of NR (New Radio) positioned as the 5th generation (5G) radio access technology.

The current NR specification has not defined a mechanism for an MBS (Multicast and Broadcast Services) service. The 3GPP has started a discussion to introduce the MBS service (NPL 1).

CITATION LIST

Non-Patent Literature

NPL 1: 3GPP Contribution "RP-193248"

SUMMARY

In a first aspect, a communication control method includes receiving, by a user equipment, a data packet belonging to an MBS (Multicast and Broadcast Services) service via a PTM (Point-to-Multipoint) radio bearer, receiving, by the user equipment from a base station, configuration information for configuring association between the PTM radio bearer and a PTP (Point-to-Point) data path for receiving the data packet belonging to the MBS service, and associating, by the user equipment, the PTP data path with the PTM radio bearer based on the configuration information.

In a second aspect, a user equipment includes a receiver configured to receive a data packet belonging to an MBS (Multicast and Broadcast Services) service via a PTM (Point-to-Multipoint) radio bearer, and a controller. The receiver receives, from a base station, configuration information for configuring association between the PTM radio bearer and a PTP (Point-to-Point) data path for receiving the data packet belonging to the MBS service. The controller associates the PTP data path with the PTM radio bearer based on the configuration information.

DESCRIPTION OF EMBODIMENTS

From the viewpoint of service continuity, a delivery of an MBS service to a user equipment may be desirably switched in an appropriate manner between a PTM (Point-to-Multipoint) transmission and a PTP (Point-to-Point) transmission.

The object of the present disclosure is to control, in an appropriate manner, the switching of the delivery of the MBS service between the PTM transmission and the PTP transmission.

A mobile communication system according to embodiments will be described with reference to the drawings. In the description of the drawings, the same and/or similar parts are denoted by the same and/or similar reference signs.

Mobile Communication System First, a configuration of the mobile communication system according to an embodiment will be described. Although the mobile communication system according to the embodiment is a 5G system of the 3GPP, LTE may be at least partially applied to the mobile communication system.

Figure 1:
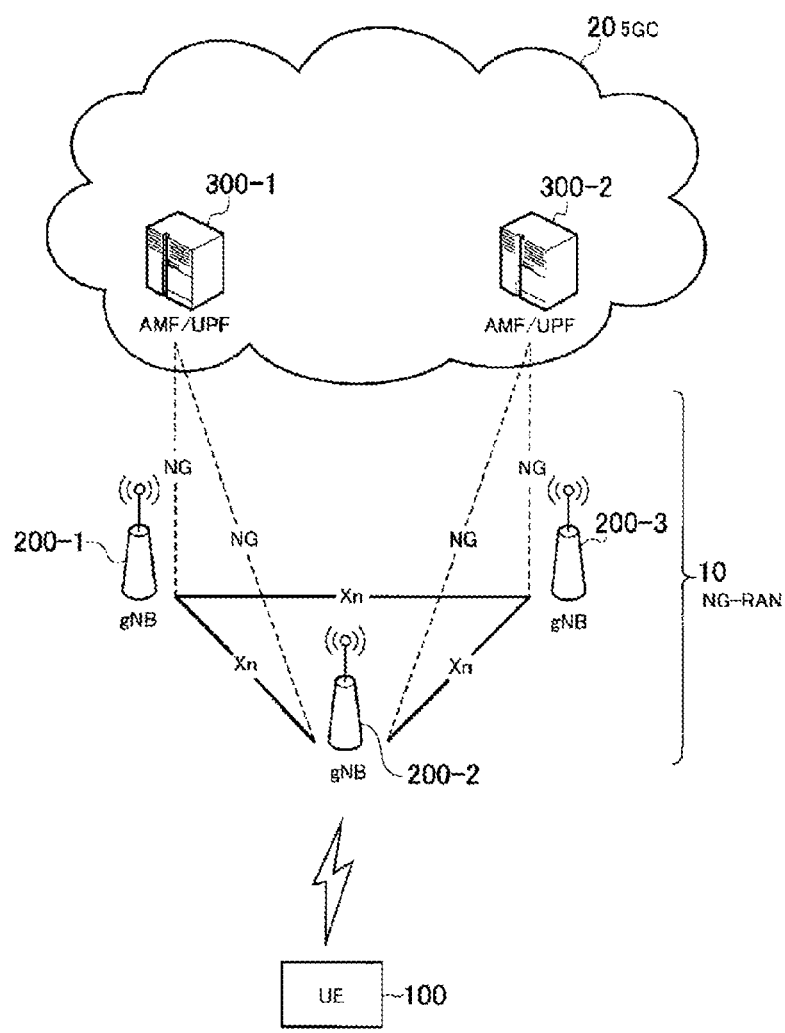
FIG. 1 is a diagram illustrating a configuration of a mobile communication system according to an embodiment.

FIG. 1 is a diagram illustrating a configuration of the mobile communication system according to an embodiment.

As illustrated in FIG. 1, the mobile communication system includes a user equipment (UE) 100, a 5G radio access network (NG-RAN (next generation radio access network)) 10, and a 5G core network (5GC) 20.

The UE 100 is a mobile apparatus. The UE 100 may be any apparatus as long as the UE 100 is used by a user. Examples of the UE 100 include a mobile phone terminal (including a smartphone), a tablet terminal, a notebook PC, a communication module (including a communication card or a chipset), a sensor or an apparatus provided on a sensor, a vehicle or an apparatus provided on a vehicle (Vehicle UE), and/or a flying object or an apparatus provided on a flying object (Aerial UE).

The NG-RAN 10 includes base stations (referred to as "gNBs" in the 5G system) 200. The gNBs 200 may also be referred to as NG-RAN nodes. The gNBs 200 are interconnected via an Xn interface which is an inter-base station interface. Each gNB 200 manages one or a plurality of cells. The gNB 200 performs wireless communication with the UE 100 that has established a connection to a cell of the gNB 200. The gNB 200 has a radio resource management (RRM) function, a function of routing user data (hereinafter simply referred to as "data"), and/or a measurement control function for mobility control and scheduling, or the like. A "cell" is used as a term to indicate a minimum unit of a wireless communication area. A "cell" is also used as a term to indicate a function or a resource for performing wireless communication with the UE 100. One cell belongs to one carrier frequency.

Note that the gNB may be connected to an Evolved Packet Core (EPC) which is a core network of LTE, or a base station of LTE may be connected to the 5GC. The base station of LTE and the gNB may be connected via the inter-base station interface.

The 5GC 20 includes an Access and Mobility Management Function (AMF) and a User Plane Function (UPF) 300. The AMF performs various types of mobility controls and the like for the UE 100. The AMF manages information of an area in which the UE 100 exists by communicating with the UE 100 by using Non-Access Stratum (NAS) signaling. The UPF controls data transfer. The AMF and the UPF are connected to the gNB 200 via an NG interface which is an interface between the base station and the core network.

Figure 2:
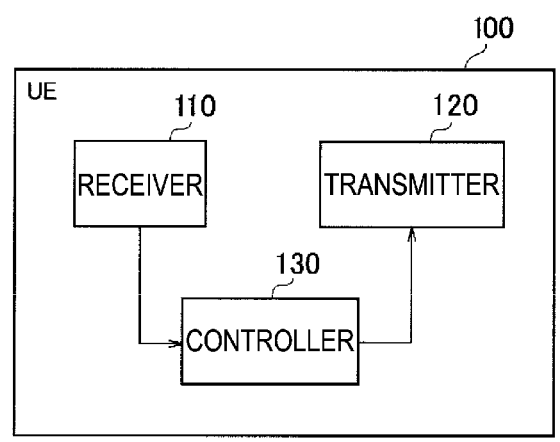
FIG. 2 is a diagram illustrating a configuration of a UE 100.

FIG. 2 is a diagram illustrating a configuration of the UE 100 (user equipment).

As illustrated in FIG. 2, the UE 100 includes a receiver 110, a transmitter 120, and a controller 130.

The receiver 110 performs various types of receptions under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmissions under control of the controller 130. The transmitter 120 includes an antenna and a transmission device. The transmission device converts a baseband signal output by the controller 130 (a transmission signal) into a radio signal and transmits the resulting signal through the antenna.

The controller 130 performs various types of controls in the UE 100. The controller 130 includes at least one processor and at least one memory electrically connected to the processor. The memory stores programs to be executed by the processor and information to be used for processes by the processor. The processor may include a baseband processor and a Central Processing Unit (CPU). The baseband processor performs modulation and demodulation, coding and decoding, and the like of a baseband signal. The CPU executes the programs stored in the memory to perform various types of processes.

Figure 3:
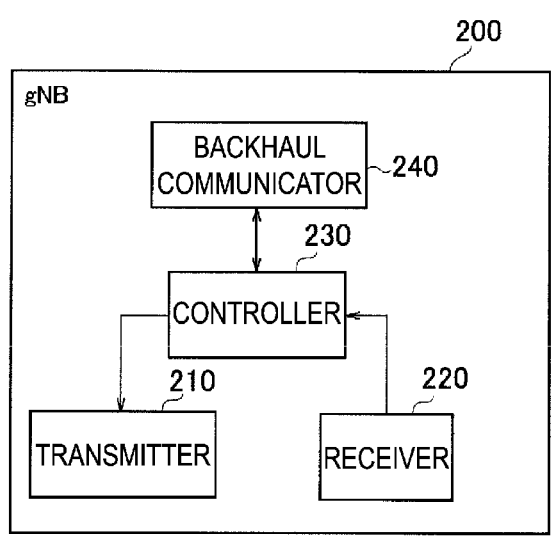
FIG. 3 is a diagram illustrating a configuration of a base station 200.

FIG. 3 is a diagram illustrating a configuration of the gNB 200 (a base station).

As illustrated in FIG. 3, the gNB 200 includes a transmitter 210, a receiver 220, a controller 230, and a backhaul communicator 240.

The transmitter 210 performs various types of transmissions under control of the controller 230. The transmitter 210 includes an antenna and a transmission device. The transmission device converts a baseband signal output by the controller 230 (a transmission signal) into a radio signal and transmits the resulting signal through the antenna.

The receiver 220 performs various types of receptions under control of the controller 230. The receiver 220 includes an antenna and a reception device. The reception device converts a radio signal received through the antenna into a baseband signal (a reception signal) and outputs the resulting signal to the controller 230.

The controller 230 performs various types of controls in the gNB 200. The controller 230 includes at least one processor and at least one memory electrically connected to the processor. The memory stores programs to be executed by the processor and information to be used for processes by the processor. The processor may include a baseband processor and a CPU. The baseband processor performs modulation and demodulation, coding and decoding, and the like of a baseband signal. The CPU executes the programs stored in the memory to perform various types of processes.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and the two units may be connected via an F1 interface.

Figure 4:
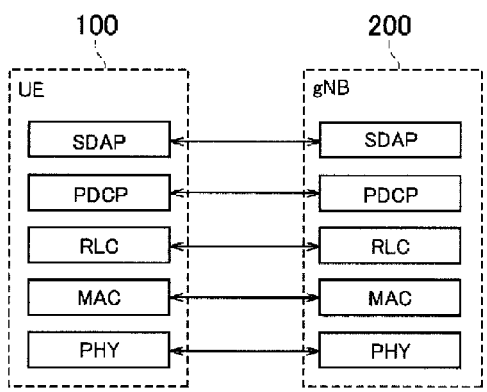
FIG. 4 is a diagram illustrating a configuration of a protocol stack of a radio interface of a user plane.

FIG. 4 is a diagram illustrating a configuration of a protocol stack of a radio interface of a user plane handling data.

As illustrated in FIG. 4, the radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer provides a transport channel to the MAC layer. The PHY layer performs coding and decoding, modulation and demodulation, antenna mapping and demapping, and resource mapping and demapping.

The MAC layer performs priority control of data, a retransmission process through a hybrid ARQ (HARQ) (HARQ process), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, modulation and coding schemes (MCSs)) in the uplink and the downlink and resource blocks to be allocated to the UE 100. The MAC layer provides a logical channel to the RLC layer. A MAC entity resides in the MAC layer.

The RLC layer transmits data to the RLC layer on the reception side by using functions of the MAC layer and the PHY layer. The RLC layer performs a retransmission process through an ARQ (ARQ process). The RLC layer provides an RLC channel to the PDCP layer. An RLC entity resides in the RLC layer.

The PDCP layer performs data transfer, PDCP SN maintenance, header compression and decompression, and encryption and decryption. The PDCP layer provides a radio bearer to the SDAP layer. A PDCP entity resides in the PDCP layer. One PDCP entity carries data of one radio bearer.

The SDAP layer performs mapping between QoS flows and radio bearers. The QoS flow is a unit of performing QoS control by the core network. Note that, when the RAN is connected to the EPC, the SDAP layer need not be provided. An SDAP entity resides in the SDAP layer.

Figure 5:
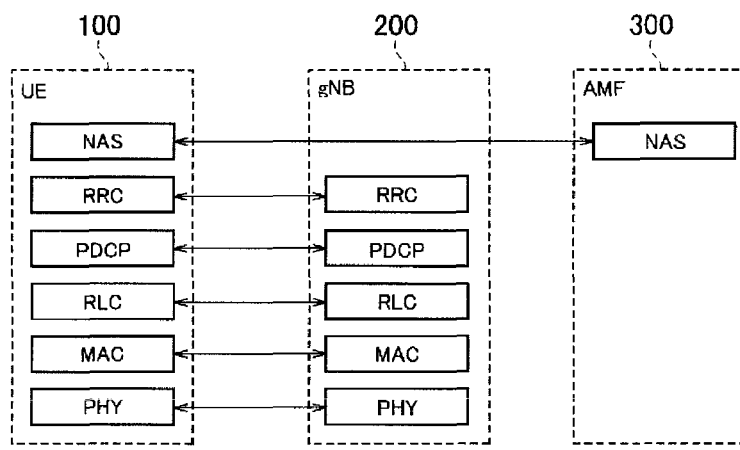
FIG. 5 is a diagram illustrating a configuration of a protocol stack of a radio interface of a control plane.

FIG. 5 is a diagram illustrating a configuration of a protocol stack of a radio interface in a control plane handling signaling (control signals).

As illustrated in FIG. 5, the protocol stack of the radio interface in the control plane includes a Radio Resource Control (RRC) layer and a Non-Access Stratum (NAS) layer instead of the SDAP layer illustrated in FIG. 4.

RRC signaling for various configurations is transmitted between the RRC layer of the UE 100 and the RRC layer of the gNB 200. The RRC layer controls a logical channel, a transport channel, and a physical channel according to establishment, reestablishment, and release of the radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the RRC connection is suspended, the UE 100 is in an RRC inactive state.

The NAS layer higher than the RRC layer performs session management, mobility management, and the like. NAS signaling is transmitted between the NAS layer of the UE 100 and the NAS layer of the AMF 300.

Note that the UE 100 has an application layer and the like other than the protocol of the radio interface.

Dual Connectivity

Figure 6:
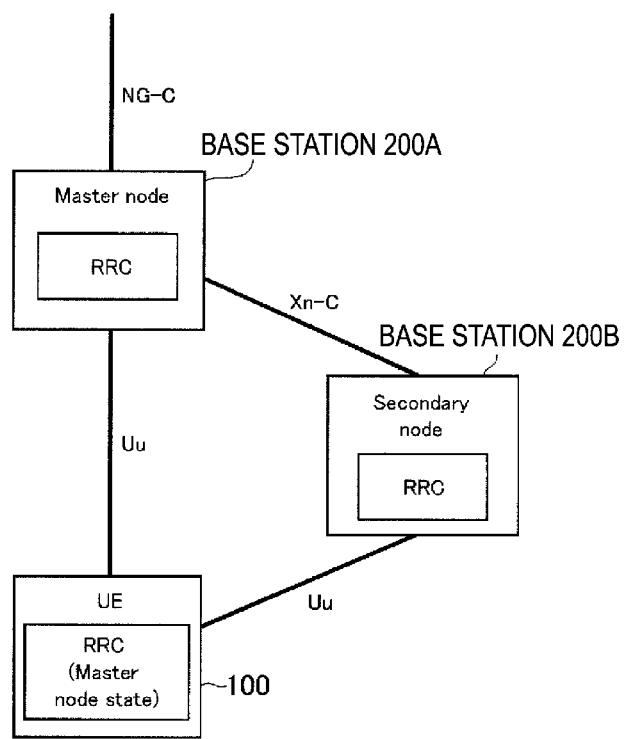
FIG. 6 is a diagram illustrating an example of DC.

A summary of dual connectivity (DC) will be described. In the following, DC including NR access is mainly assumed. Such DC may be referred to as Multi-RAT DC (MR-DC) or Multi-connectivity. FIG. 6 is a diagram illustrating an example of DC.

As illustrated in FIG. 6, in the DC, the UE 100 including a plurality of transceivers is configured to utilize resources (time resources and frequency resources) provided by two different nodes (two different base stations). One base station provides NR access and the other base station provides E-UTRA (LTE) or NR access. In the example illustrated in FIG. 6, a base station 200A may be an eNB or a gNB, and a base station 200B may be an eNB or a gNB.

The one base station 200A functions as a master node, and the other base station 200B functions as a secondary node. The master node is a radio access node that provides control plane connection to the core network. The master node may be referred to as a master base station. The secondary node is a radio access node that does not have control plane connection to the core network. The secondary node may be referred to as a secondary base station.

The master node is connected to the secondary node via a network interface (inter-base station interface), and at least the master node is connected to the core network. FIG. 6 illustrates an example in which the inter-base station interface is an Xn interface; however, the inter-base station interface may be an X2 interface.

A group of serving cells that are cells of the master node and are configured for the UE 100 is referred to as a master cell group (MCG). On the other hand, a group of serving cells that are cells of the secondary node and are configured for the UE 100 is referred to as a secondary cell group (SCG). The UE 100 includes a MAC entity corresponding to the MCG (MCG MAC) and a MAC entity corresponding to the SCG (SCG MAC).

Overview of MBS Service Reception

An overview of an MBS service reception will be described. The UE 100 may receive the MBS service in an RRC connected state, or may receive the MBS service in the RRC idle state or the RRC inactive state.

Figure 7:
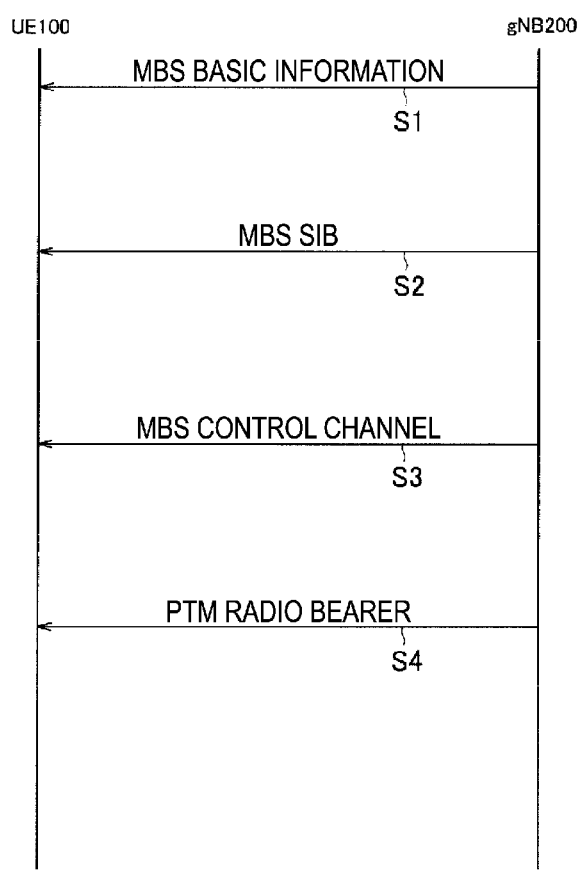
FIG. 7 is a diagram illustrating an example for receiving an MBS service.

FIG. 7 is a diagram illustrating an example for receiving the MBS service. As illustrated in FIG. 7, in step S1, the UE 100 acquires MBS basic information from the 5GC 20 via the gNB 200. The MBS basic information may be referred to as a User Service Description (USD). The MBS basic information includes, for each MBS service, MBS identification information for identifying the MB S service and a frequency at which the MBS service is provided. The MBS identification information may be referred to as a Temporary Mobile Group Identity (TMGI).

In step S2, the UE 100 receives an MBS SIB from the gNB 200. The MBS SIB includes information required for acquiring a PTM control channel for MBS (scheduling information).

In step S3, the UE 100 receives MBS control information from the gNB 200 via the PTM control channel for MBS, based on the MBS SIB. The MBS control information includes information required for configuring a PTM data channel for the MBS in the cell in which the MBS control information is transmitted. The PTM data channel is a PTM logical channel for data transmission. The PTM logical channel may be a multicast logical channel, or may be a broadcast logical channel.

In step S4, the UE 100 establishes a PTM radio bearer with the gNB 200 based on the MBS control information, and receives, via the PTM radio bearer, a data packet belonging to the MBS service in which the UE 100 has interest (MBS data packet).

Communication Control Method

A communication control method according to an embodiment will be described.

(1) Basic Operation

Figure 8:
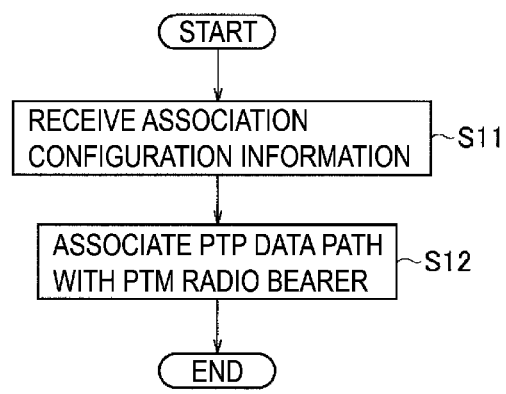
FIG. 8 is a diagram illustrating a sequence of a basic operation according to an embodiment.

FIG. 8 is a diagram illustrating a sequence of a basic operation according to an embodiment.

As illustrated in FIG. 8, in step S11, the UE 100 receives, from the gNB 200, association configuration information for configuring association of the PTM radio bearer with a PTP data path to receive the data belonging to the MBS service (MBS data). The PTP data path is a PTP radio bearer or a PTP logical channel Note that the PTP data path may be an IP flow. The IP flow is a stream of a series of packets from a particular IP address to a particular IP address. The PTP radio bearer may be a unicast radio bearer. The PTP logical channel may be a unicast logical channel.

In step S12, the UE 100 associates the PTP data path with the PTM radio bearer based on the association configuration information. This allows the delivery of the MBS service to the UE 100 to be switched between the PTM and the PTP.

Figure 9:
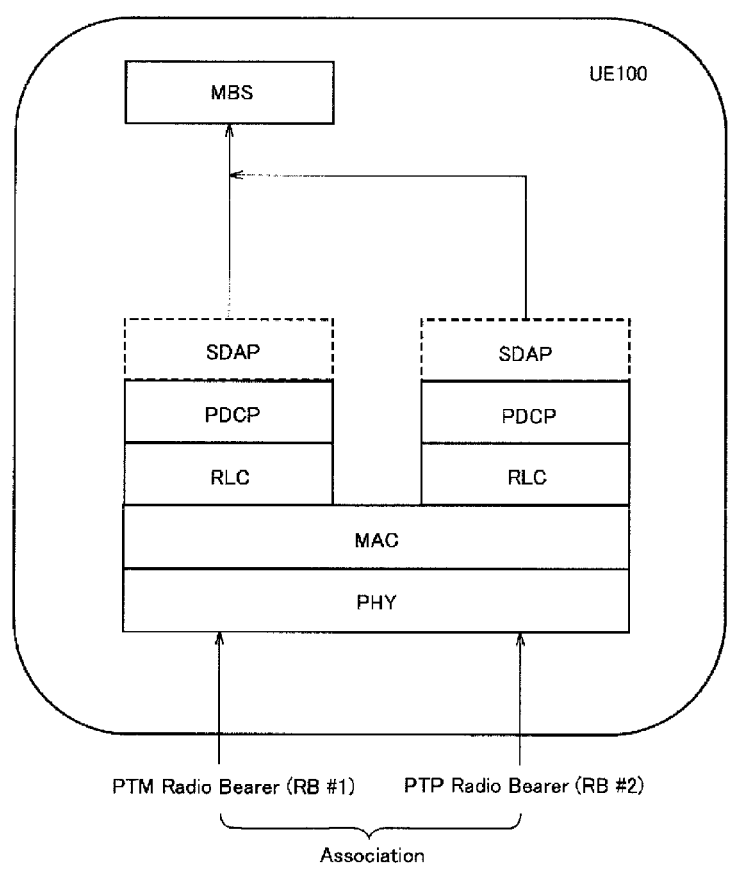
FIG. 9 is a diagram illustrating association between a PTP radio bearer and a PTM radio bearer according to an embodiment.

A case of associating the PTP radio bearer with the PTM radio bearer (i.e., a case where the "PTP data path" described above is the PTP radio bearer) is described. FIG. 9 is a diagram illustrating association between the PTP radio bearer and the PTM radio bearer.

As illustrated in FIG. 9, the UE 100 associates the PTP radio bearer (RB #2) with the PTM radio bearer (RB #1) based on the association configuration information. Such association configuration information includes information for configuring the association between the PTP radio bearer and the PTM radio bearer (hereinafter, referred to as "PTP radio bearer configuration information").

The PTP radio bearer configuration information includes a bearer identifier of the PTP radio bearer (a bearer identifier of RB #2) and PDCP configuration information for configuring a PDCP entity of the PTP radio bearer. The PTP radio bearer configuration information may further include a bearer identifier of the PTM radio bearer to be associated with the PTP radio bearer. When only one PTM radio bearer is established in the UE 100, the PTP radio bearer configuration information may not include the bearer identifier of the PTM radio bearer but may include the bearer identifier of the PTP radio bearer and information indicating that the PTP radio bearer is a bearer for MBS service reception (e.g., "for MBS"="true").

Here, the PTP radio bearer to be associated with the PTM radio bearer may be a radio bearer already established in the UE 100, or may be a radio bearer that the UE 100 newly establishes.

Once the UE 100 receives the PTP radio bearer configuration information, the UE 100 determines whether the bearer identifier of the PTP radio bearer included in the PTP radio bearer configuration information is already stored in the UE 100. When the bearer identifier is already stored in the UE 100 (i.e., when the UE 100 already establishes the PTP radio bearer identifying the bearer identifier), the UE 100 reconfigures the PDCP entity of the PTP radio bearer identified by the bearer identifier based on the PDCP configuration information. When the bearer identifier is not stored in the UE 100, the UE 100 newly establishes a PDCP entity based on the PDCP configuration information, and newly establishes a PTP radio bearer corresponding to the PDCP entity.

The PTP radio bearer configuration information may include SDAP configuration information configuring the SDAP entity corresponding to the PTM radio bearer. The UE 100 configures the SDAP entity corresponding to the PTM radio bearer based on the SDAP configuration information.

The PTP radio bearer configuration information may include an identifier of the MBS service to which the data packet transmitted on the PTP radio bearer belongs.

As illustrated in FIG. 9, the UE 100 includes a higher layer entity (MBS entity) residing in a higher layer than the PDCP layer, the higher layer entity managing the MBS service. The PDCP entity or the SDAP entity passes the data packet received via the PTP radio bearer to the MBS entity. The MBS entity may be included in the SDAP entity (i.e., the SDAP entity manages the MBS service).

Figure 10:
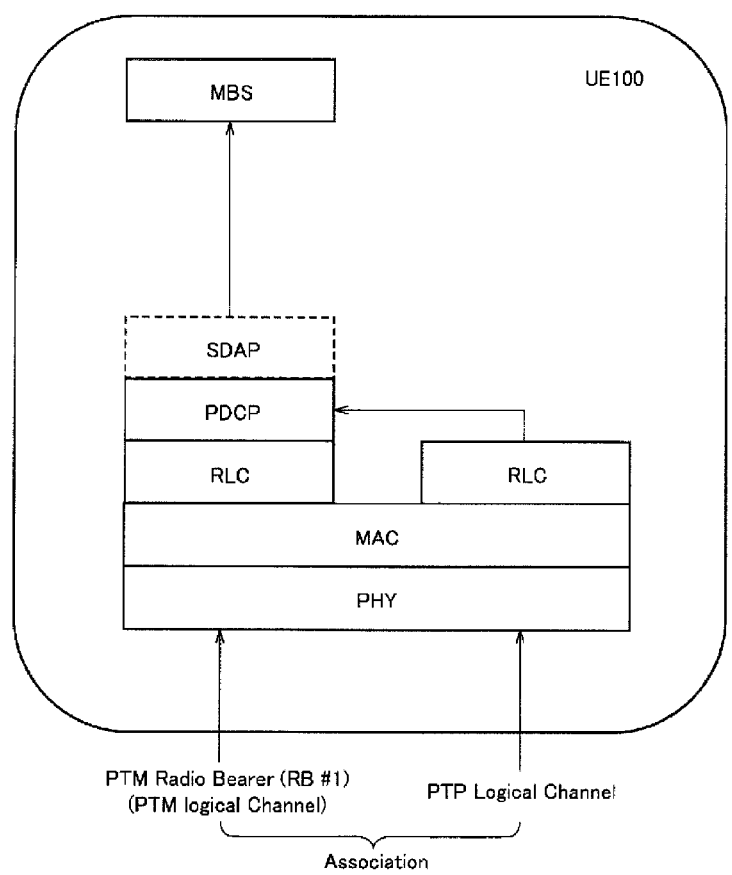
FIG. 10 is a diagram illustrating association between a PTP logical channel and the PTM radio bearer according to an embodiment.

A case of associating the PTP logical channel with the PTM radio bearer (i.e., a case where the PTP data path is the PTP logical channel) is described. FIG. 10 is a diagram illustrating association between the PTP logical channel and the PTM radio bearer.

As illustrated in FIG. 10, the UE 100 associates the PTP logical channel with the PTM radio bearer (RB #1) based on the association configuration information. Such association configuration information includes information for configuring the association between the PTP logical channel and the PTM radio bearer (hereinafter, referred to as "PTP logical channel configuration information").

The PTP logical channel configuration information includes the bearer identifier of the PTM radio bearer and a channel identifier of the PTP logical channel to be associated with the PTM radio bearer.

Once the UE 100 receives the PTP logical channel configuration information, the UE 100 determines whether the channel identifier included in the PTP radio bearer configuration information is already stored in the UE 100. When the channel identifier is already stored in the UE 100, the UE 100 reconfigures the RLC entity corresponding to the PTP logical channel identified by the channel identifier. When the channel identifier is not stored in the UE 100, the UE 100 newly establishes an RLC entity, and newly establishes a PTP logical channel corresponding to the RLC entity.

Thus, the UE 100 associates the PTP logical channel identified by the channel identifier with the PDCP entity of the PTM radio bearer. As illustrated in FIG. 10, in this case, the PDCP entity of the PTM radio bearer is associated with one PTM logical channel and one PTP logical channel. The RLC entity corresponding to the PTP logical channel delivers the data packet received via the PTP logical channel to the PDCP entity of the PTM radio bearer.

The UE 100 may enable or disable the PTP data path described above (the PTP data path for the UE 100 to receive the data belonging to the MBS service) in response to an indication from the gNB 200. This allows the delivery of the MBS service to the UE 100 to be dynamically switched between the PTM and the PTP. Note that the UE 100 may enable or disable the PTM data path (the PTM radio bearer or the PTM logical channel) in response to an indication from the gNB 200.

The association configuration information described above may include information configuring an initial state (enabled state or disabled state) of the PTP data path configured with the association. Enabling the PTP data path includes starting a reception via the PTP data path. Disabling the PTP data path includes stopping a reception via the PTP data path. For example, once the UE 100 receives the association configuration information including the information configuring the initial state of the PTP data path as the disabled state, the UE 100 associates the PTP data path with the PTM radio bearer and disables the PTP data path. After that, the UE 100 enables the PTP data path in response to an indication from the gNB 200, and starts receiving the MBS data via the PTP data path. Note that the association configuration information may include information configuring an initial state (enabled state or disabled state) of the PTM data path configured with the association.

The UE 100, when associating the PTP radio bearer with the PTM radio bearer, may stop the reception via the PTM radio bearer after the PTP radio bearer is enabled.

The UE 100, when associating the PTP logical channel with the PTM radio bearer, may stop the reception via the PTM logical channel associated with the PTM radio bearer after the PTP logical channel is enabled.

The indication of the enabling and/or the indication of the disabling described above are performed, for example, by a MAC CE (Control Element). The indication may include an identifier indicating a subject (the PTP data path and/or the PTM data path) to be enabled/disabled. Alternatively, the indication may include information indicating the enabling/disabling (for example, 1 bit), and the information may be associated with a subject (the PTP data path and/or the PTM data path) to be enabled/disabled by an array.

When the UE 100 configured with the above-described association is handed over, the gNB 200 transmits the information indicating the association to another gNB 200 managing a target cell to which the UE 100 is to be handed over.

When the DC is configured for the UE 100, the PTP data path in the association described above may be a data path that uses resources of the secondary node (the base station 200B) (hereinafter, referred to as a "SCG data path"). On the other hand, the PTM radio bearer is established between the UE 100 and the master node (the base station 200A).

When the SCG data path is a PTP radio bearer, the PTP radio bearer is a radio bearer established between the UE 100 and the base station 200B. When the SCG data path is a PTP logical channel, the PTP logical channel is a logical channel corresponding to the SCG MAC entity of the UE 100.

The UE 100 receives the association configuration information from the base station 200A, and configures association. On the other hand, the base station 200A transmits information indicating the association configured by the association configuration information to the base station 200B.

(2) Operation Pattern 1

An operation pattern 1 according to an embodiment with the assumption of the basic operation described above is described. The operation pattern 1 is an example of transmitting, by the UE 100, a sequence number corresponding to the MBS data packet required to receive in the PTP transmission.

Figure 11:
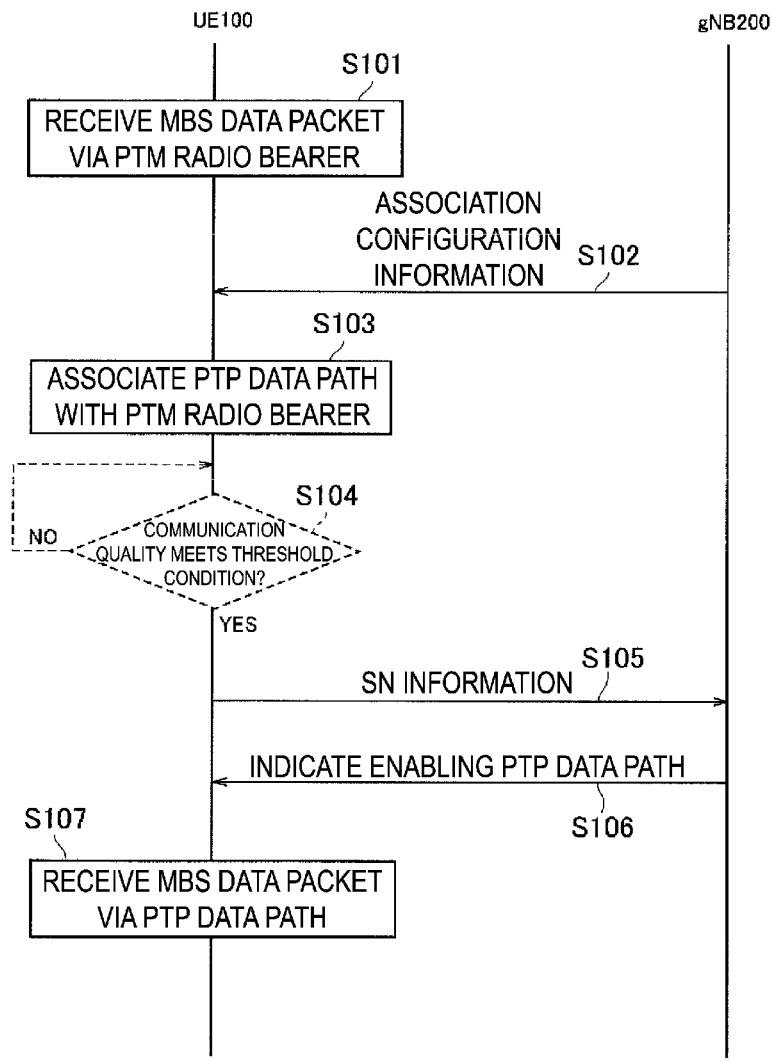
FIG. 11 is a diagram illustrating an operation in an operation pattern 1 according to an embodiment.

FIG. 11 is a diagram illustrating an operation in the operation pattern 1. In an initial state of the operation pattern, the UE 100 is in a state of establishing the RRC connection with the gNB 200 (RRC connected state).

As illustrated in FIG. 11, in step S101, the UE 100 receives the MBS service from the gNB 200 via the PTM radio bearer.

In step S102, the UE 100 receives the association configuration information from the gNB 200. Here, the association configuration information includes the information configuring the initial state of the PTM data path as the disabled state. The association configuration information may be transmitted in an RRC message (e.g., RRCReconfiguration message).

In step S103, the UE 100 associates the PTP data path with the PTM radio bearer and disables the PTP data path.

In step S104, the UE 100 measures a parameter indicating a communication quality between the UE 100 and the gNB 200 (a communication quality on the PTM radio bearer) to determine whether the parameter meets a threshold condition.

The parameter indicating the communication quality corresponds to at least one selected from the group consisting of a Reference Signal Received Power (RSRP), a Reference Signal Received Quality (RSRQ), a Reference Signal-Signal to Interference plus Noise power Ratio (RS-SINR), a throughput, an error rate, the number of data packets for reception failure, and a duration of the reception failure (e.g., the number of milliseconds, the number of subframes, or the number of SFNs).

Here, the parameter indicating the communication quality meeting the threshold condition indicates that the communication quality is not good. When the parameter indicating the communication quality corresponds to at least one selected from the group consisting of the RSRP, the RSRQ, the RS-SINR, and the throughput, meeting the threshold condition means that the parameter indicating the communication quality is equal to or less than a threshold. When the parameter indicating the communication quality corresponds to at least one selected from the group consisting of the error rate, the number of data packets for the reception failure, and the duration of the reception failure, meeting the threshold condition means that the parameter indicating the communication quality is less than a threshold. The threshold of the threshold condition is configured by the gNB 200 for the UE 100.

When the parameter indicating the communication quality meets the threshold condition (step S104: YES), the UE 100 causes the process to proceed to step S105.

In step S105, the UE 100 transmits, to the gNB 200, information indicating the sequence number corresponding to the MBS data packet required to receive in the PTP transmission scheme (hereinafter, "SN information"). The SN information may be transmitted in the RRC message. The sequence number is any one of a PDCP sequence number, an RLC sequence number, and a new sequence number for MBS. The new sequence number for MBS may be defined as a PDU (Packet Data Unit) header dedicated to the MBS in a SDAP header, for example.

The SN information may indicate one sequence number (e.g., SN #n) corresponding to the first MBS data packet which the UE 100 is required to receive in the PTP transmission scheme, or may indicate a range of the sequence numbers (e.g., SN #n to SN #n+m) corresponding to a plurality of MBS data packets which the UE 100 is required to receive in the PTP transmission scheme.

The SN information may include identification information for identifying the MBS service to which the MBS data packet belongs. The SN information may include the bearer identifier of the PTM radio bearer. Thus, the gNB 200, when delivering a plurality of MBS services, can identify an MBS service requested by the UE 100 among the plurality of MBS services, and can transmit an MBS data packet corresponding to the MBS service to the UE 100.

In step S106, the gNB 200 transmits an indication of enabling the PTP data path to the UE 100.

In step S107, the UE 100 enables the PTP data path and starts receiving the MBS data packet via the PTP data path. Here, the gNB 200, when receiving the SN information indicating one sequence number, transmits the MBS data packet corresponding to the sequence number and subsequent MBS data packets to the UE 100 via the PTP data path. The gNB 200, when receiving the SN information indicating the range of the sequence numbers, transmits a plurality of MBS data packets corresponding to the range of the sequence numbers to the UE 100 via the PTP data path. The gNB 200, when completing the transmission of the plurality of MBS data packets, may transmit an indication of disabling the PTP data path to the UE 100.

In the operation pattern 1, the process in step S104 may be omitted. With the process in step S104 omitted, when the UE 100 is required to receive the MBS data packet in the PTP, the UE 100 transmits the SN information.

(3) Operation Pattern 2

Figure 12:
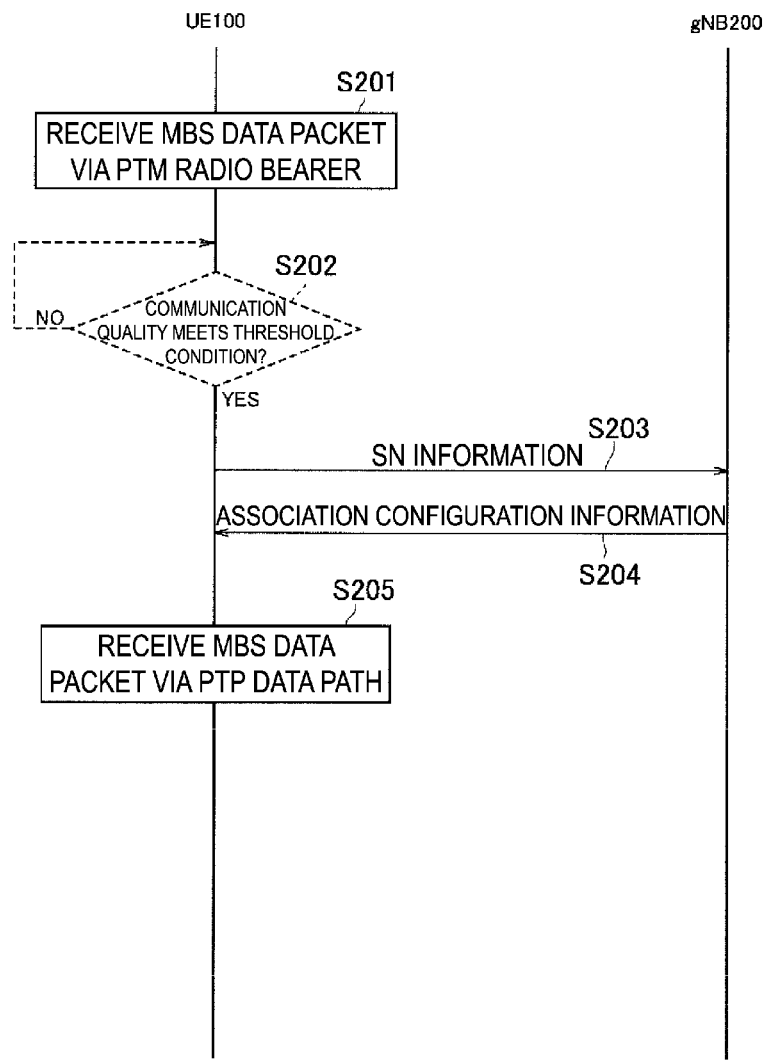
FIG. 12 is a diagram illustrating an operation in an operation pattern 2 according to an embodiment.

An operation pattern 2 according to an embodiment will be described mainly focusing on differences from the operation pattern 1. FIG. 12 is a diagram illustrating an operation in the operation pattern 2. In an initial state of the operation pattern, the state of the UE 100 corresponds to any one of the RRC connected state, the RRC idle state, and the RRC inactive state.

As illustrated in FIG. 12, in step S201, the UE 100 receives the MBS service from the gNB 200 via the PTM radio bearer.

The process in step S202 is the same as, and/or similar to, the process in step S104.

In step S203, the UE 100 transmits the SN information to the gNB 200. Here, when the UE 100 is in the RRC inactive state or the RRC idle state, the UE 100 may transition to the RRC connected state, and then transmit the SN information to the gNB 200. The UE 100 may transmit the SN information while an RRC connection establishment procedure to transition from the RRC idle state to the RRC connected state is performed. For example, the UE 100 includes and transmits the SN information in an RRCSetupRequest message. The UE 100 may transmit the SN information while an RRC connection resume procedure to transition from the RRC inactive state to the RRC connected state is performed. For example, the UE 100 includes and transmits the SN information in an RRCResumeRequest message.

In step S204, the UE 100 receives the association configuration information from the gNB 200. Here, the association configuration information includes information for configuring the initial state of the PTP data path to be the enabled state. The association configuration information may be transmitted in an RRCReconfiguration message.

When the gNB 200 in step S203 receives the RRCSetupRequest message including the SN information, the gNB 200 in step S204 includes and transmits the association configuration information in the RRCSetup message. The RRCSetup message is a message for causing the UE 100 to transition from the RRC idle state to the RRC connected state. The UE 100 transitions to the RRC connected state in response to the reception of the RRCSetup message.

When the gNB 200 in step S203 receives the RRCResumeRequest message including SN information, the gNB 200 in step S204 includes and transmits the association configuration information in the RRCResume message. The RRCResume message is a message for causing the UE 100 to transition from the RRC inactive state to the RRC connected state. The UE 100 transitions to the RRC connected state in response to the reception of the RRCResume message.

In step S205, the UE 100 associates the PTP data path with the PTM radio bearer, and enables the PTP data path to start receiving the MBS data packet via the PTP data path.

(4) Operation Pattern 3

Figure 13:
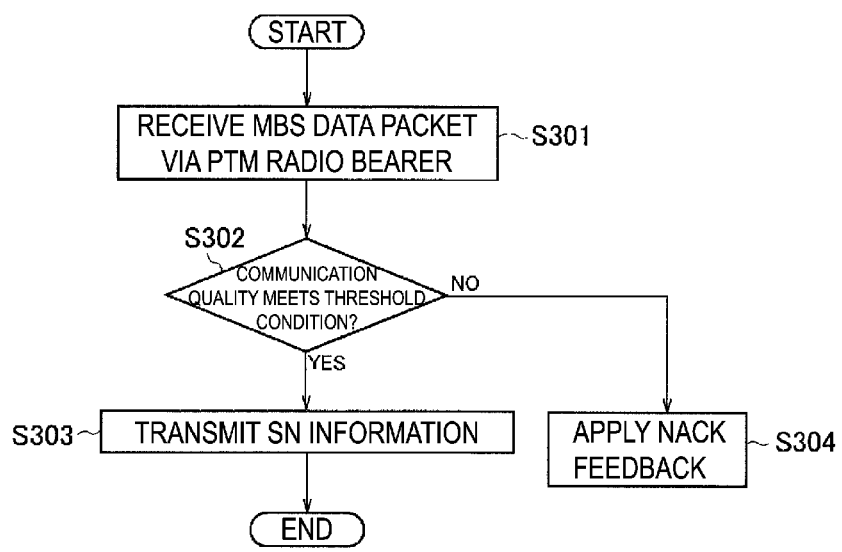
FIG. 13 is a diagram illustrating an operation in an operation pattern 3 according to an embodiment.

An operation pattern 3 according to an embodiment will be described mainly focusing on differences from the operation pattern 1. FIG. 13 is a diagram illustrating an operation for the operation pattern 3. In an initial state of the operation pattern, the state of the UE 100 corresponds to any one of the RRC connected state, the RRC idle state, and the RRC inactive state.

In step S301, the UE 100 receives the MBS service from the gNB 200 via the PTM radio bearer.

The process in step S302 is the same as, and/or similar to, the process in step S104. When the parameter indicating the communication quality meets the threshold condition (step S302: YES), the UE 100 causes the process to proceed to step S303. On the other hand, when the parameter indicating the communication quality does not meet the threshold condition (step S302: NO), the UE 100 causes the process to proceed to step S304.

In step S303, the UE 100 transmits the SN information to the gNB 200.

In step S304, the UE 100 applies the transmission of Negative Acknowledgement (NACK) feedback. The NACK feedback is feedback information for requesting retransmission of the MBS data packet via the PTM radio bearer. The NACK feedback may be information for requesting retransmission by a HARQ process (HARQ feedback), or may be information for requesting retransmission by an ARQ process (ARQ feedback). The UE 100 applying the transmission of the NACK feedback, when failing to receive the MBS data packet transmitted via the PTM radio bearer, transmits the NACK feedback corresponding to the MBS data packet to the gNB 200. The gNB 200, when receiving the NACK feedback, retransmits the data packet corresponding to the NACK feedback on the PTM radio bearer (PTM logical channel).

In this way, the UE 100 under the gNB 200 applies the transmission of the NACK feedback or switches to the PTP transmission depending on the communication quality. Accordingly, frequent PTM retransmissions due to all the UEs 100 under the gNB 200 applying the transmission of the NACK feedback can be avoided.

Other Embodiments

In an embodiment described above, the UE 100 associates one PTM logical channel with one PTP logical channel based on the association configuration information, but the embodiment is not limited thereto. The UE 100, when receiving the MBS service via one or more PTM logical channels, may receive, from the gNB 200, the association configuration information including information configuring associations between one or more PTP logical channels and one or more PTM logical channels to configure the associations.

A program may be provided that causes a computer to execute each of processes performed by the UE 100 or the base stations 200 (the base station 200A, the base station 200B). The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM, a DVD-ROM, or the like.

Circuits for executing the processes to be performed by the UE 100 or the base stations 200 (the base station 200A, the base station 200B) may be integrated, and at least part of the UE 100 or the base stations 200 (the base station 200A, the base station 200B) may be configured as a semiconductor integrated circuit (a chipset or an SoC).

Embodiments have been described above in detail with reference to the drawings, but specific configurations are not limited to those described above, and various design variations can be made without departing from the gist of the present disclosure.

The invention claimed is:

1. A communication control method comprising:
   receiving, by a user equipment, a data packet belonging to an MBS (Multicast and Broadcast Service) service via a multicast radio bearer;
   receiving, by the user equipment from a network node, first configuration information configuring association between the multicast radio bearer and a PTM (Point-to-Multipoint) logical channel and second configuration information configuring association between the multicast radio bearer and a PTP (Point-to-Point) logical channel; and
   associating, by the user equipment, both the PTP logical channel and the PTM logical channel with the multicast radio bearer based on the first configuration information and the second configuration information.

2. The communication control method according to claim 1, wherein
   the communication control method comprises delivering, by an RLC entity corresponding to the PTP logical channel, a data packet received via the PTP logical channel to a PDCP entity of the multicast radio bearer.

3. The communication control method according to claim 1, further comprising:
   transmitting, by the network node, information indicating the association, to another network node managing a target cell to which the user equipment is to be handed over.

4. A user equipment comprising:
   a receiver configured to receive a data packet belonging to an MBS (Multicast and Broadcast Service) service via a multicast radio bearer; and
   a controller, wherein
   the receiver is configured to receive, from a network node, first configuration information configuring association between the PTM multicast radio bearer and a PTM (Point-to-Multipoint) logical channel and second configuration information configuring association between the multicast radio bearer and a PTP (Point-to-Point) logical channel, and
   the controller is configured to associate both the PTP logical channel and the PTM logical channel with the multicast radio bearer based on the first configuration information and the second configuration information.

5. An apparatus controlling a user equipment, the apparatus comprising a processor and a memory, the processor configured to receive a data packet belonging to an MBS (Multicast and Broadcast Service) service via a multicast radio bearer, receive, from a network node, first configuration information configuring association between the multicast radio bearer and a PTM (Point-to-Multipoint) logical channel and second configuration information configuring association between the multicast radio bearer and a PTP (Point-to-Point) logical channel, and associate both the PTP logical channel and the PTM logical channel with the multicast radio bearer based on the first configuration information and the second configuration information.

6. A network node comprising:

a transmitter configured to transmit a data packet belonging to an MBS (Multicast and Broadcast Service) service via a multicast radio bearer, wherein the transmitter is configured to transmit to a user equipment, first configuration information configuring association between the multicast radio bearer and a PTM (Point-to-Multipoint) logical channel and second configuration information configuring association between the multicast radio bearer and a PTP (Point-to-Point) logical channel.

\* \* \* \* \*